(12) United States Patent
Oliver et al.

(10) Patent No.: US 6,422,360 B1
(45) Date of Patent: Jul. 23, 2002

(54) DUAL MODE SUSPENSION DAMPER CONTROLLED BY MAGNETOSTRICTIVE ELEMENT

(75) Inventors: Michael Leslie Oliver, Xenia; William Charles Kruckemeyer, Beavercreek, both of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/820,190

(22) Filed: Mar. 28, 2001

(51) Int. Cl.[7] .................................................. F16F 9/46
(52) U.S. Cl. ........................ 188/266.5; 188/266.3; 188/266.4; 188/282.2; 188/322.15
(58) Field of Search .................... 188/322.15, 266.7, 188/266.6, 266.5, 266.4, 266.3, 266.2, 267.1, 267.2, 282.2, 282.1

(56) References Cited

U.S. PATENT DOCUMENTS 5,454,452 A * 10/1995 Ohlin .................... 188/322.15
5,690,195 A * 11/1997 Kruckemeyer et al. 188/322.15

* cited by examiner

*Primary Examiner*—Matthew C. Graham
(74) *Attorney, Agent, or Firm*—Scott A. McBain

(57) ABSTRACT

Parallel paths for damping fluid are provided through the piston of a suspension damper, each of which are provided with separate damping valving sets to control damping. Communication through one of the paths is controlled by a movable control valve member, which is controlled by a magnetostrictive element which deforms in response to application of a magnetic field. The control valve member is moved between active and inactive positions in response to changes in a magnetic field applied by a coil mounted within the damper piston. In one position, all communication of damping fluid is through one of the damping valve sets, while in the other positon damping fluid communicates through both valve sets. Accordingly, damping levels may be varied by controlling the magnetic field.

23 Claims, 9 Drawing Sheets

DUAL MODE SUSPENSION DAMPER CONTROLLED BY MAGNETOSTRICTIVE ELEMENT

TECHNICAL FIELD

This invention relates to a dual mode suspension damper which is switched between different levels of damping by a magnetostrictive element controlled by a magnetic field.

BACKGROUND OF THE INVENTION

Vehicle suspension systems require suspension dampers (such as shock absorbers or struts) to control oscillations in the vehicle suspension system. Conventional dampers include a housing filled with damping fluid and a piston slidable in the housing. A piston rod extends from the housing and connects the piston to the sprung mass (body) of the vehicle, while the housing is attached to an unsprung mass of the vehicle. Appropriate valving within the piston controls communication of damping fluid across the piston, to thereby dampen the suspension oscillations. Since conventional dampers have only a single valve in the piston and therefore are able to damp only at a set damping force, such dampers involve compromises in vehicle suspension performance.

More recently, variable suspension dampers have been proposed, in which the damping level can be varied between two separate levels in response to varying vehicle operating conditions as sensed by sensors on the vehicle. Such a damper is disclosed in U.S. Pat. No. 5,690,195. In the damper disclosed in this patent, two separate flow paths with separate valving are provided through the piston. A solenoid valve controls communication through one of the flow paths. Accordingly, damping can be adjusted or varied between two different levels, depending upon vehicle operating conditions.

SUMMARY OF THE INVENTION

According to the present invention, parallel paths are provided through the piston of a suspension damper, each of which are provided with separate damping valving. Communication through one of the paths is controlled by a movable valve element, which is controlled by a magnetostrictive element which deforms in response to application of a magnetic field. The movable valve element responds to changes in the magnetostrictive element as a result of application of a magnetic field to open or close the corresponding path. Magnetostrictive materials used to fabricate the magnetostrictive elements used in this invention include nickel and various other compounds available commercially.

DESCRIPTION OF THE PREFERRED EMBODIMENT

Figure 1:
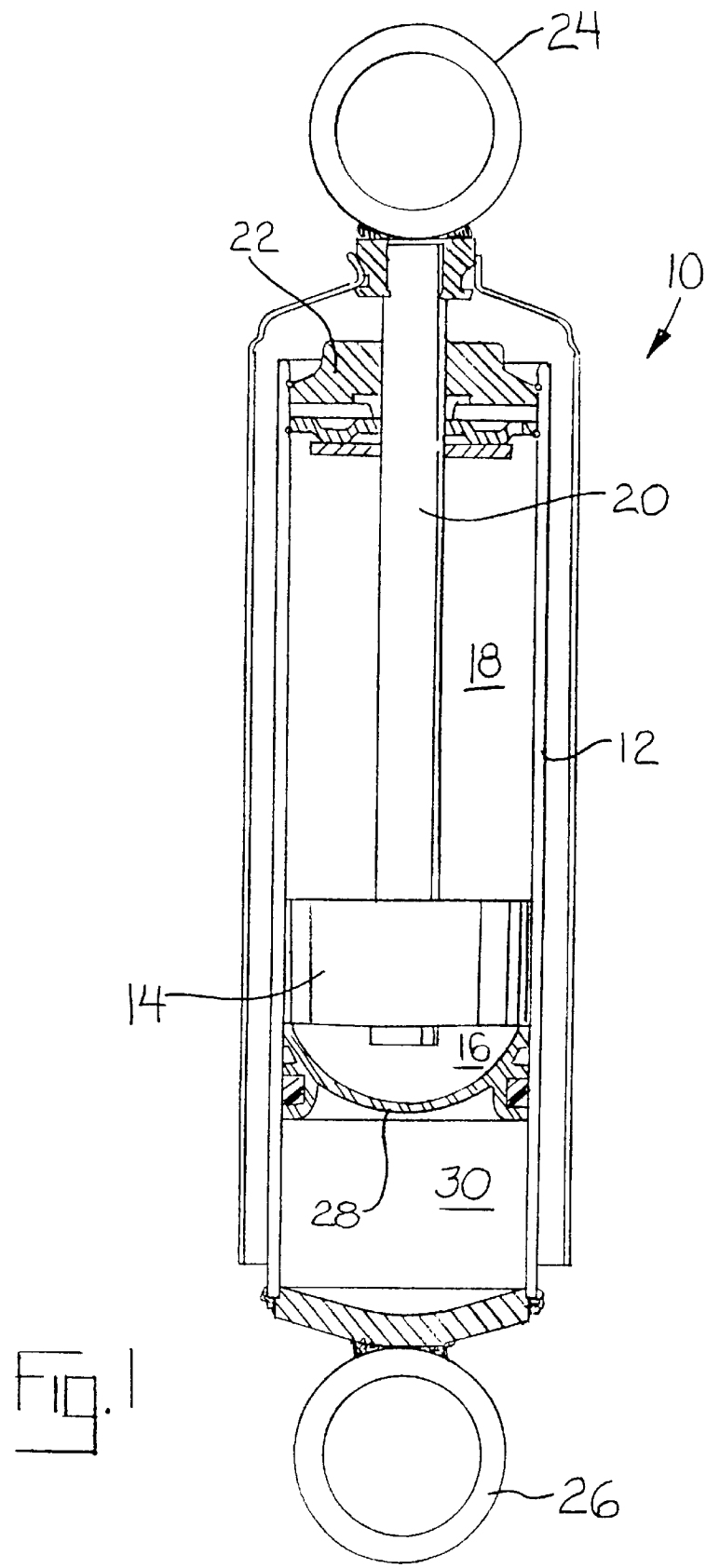
FIG. 1 is a longitudinal cross sectional view of a suspension damper incorporating the present invention.

Referring now to FIG. 1, a suspension damper, such as a shock absorber, is generally indicated by the numeral 10 and includes a cylindrical housing 12 filled with damping fluid. A piston 14 is slidable within the housing 12 and divides the latter into a compression chamber 16 and a rebound chamber 18. A piston rod 20 extends from the piston 14 through the rebound chamber 18 and closure member 22. An attachment fitting 24 on piston rod 20 permits the piston rod 20 to be secured to the sprung mass of the vehicle (the vehicle body) and an attachment fitting 26 on housing 12 permits the housing 12 to be secured to an unsprung mass of the vehicle. A conventional gas cap 28 slides in the compression chamber 16 and separates the latter from gas chamber 30, which is charged with compressed gas in a conventional manner to permit the damper 10 to accommodate changes in volume of the rebound chamber 18 in response to changes in volume of the piston rod within rebound chamber 18 in response to movement of the piston 14. Gas cap 28 also reduces cavitation of the damping fluid, all in a manner well known to those skilled in the art.

Figure 2:
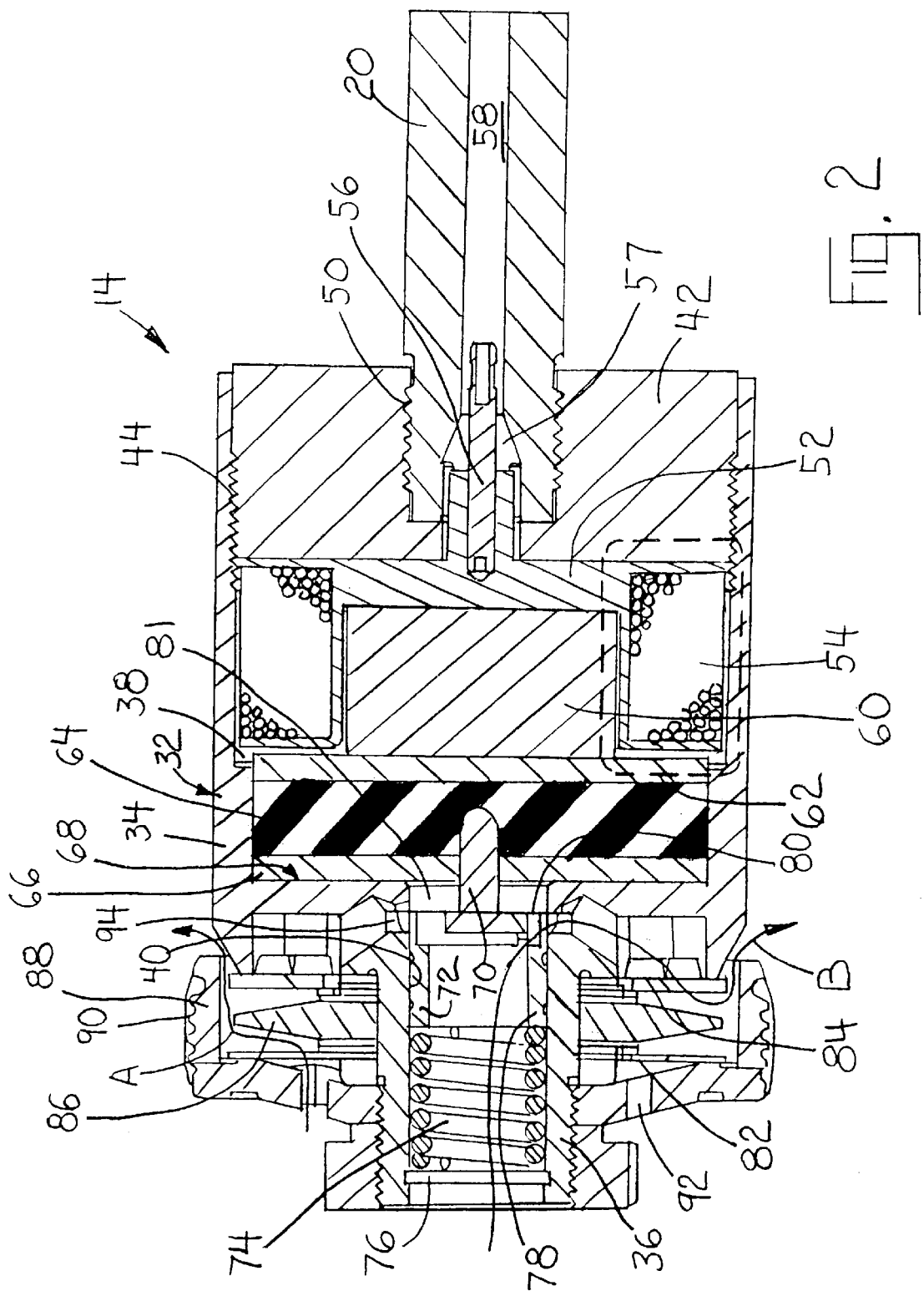
FIG. 2 is an enlarged, longitudinal cross sectional view taken through the piston used in the suspension damper of FIG. 1.
Figure 3:
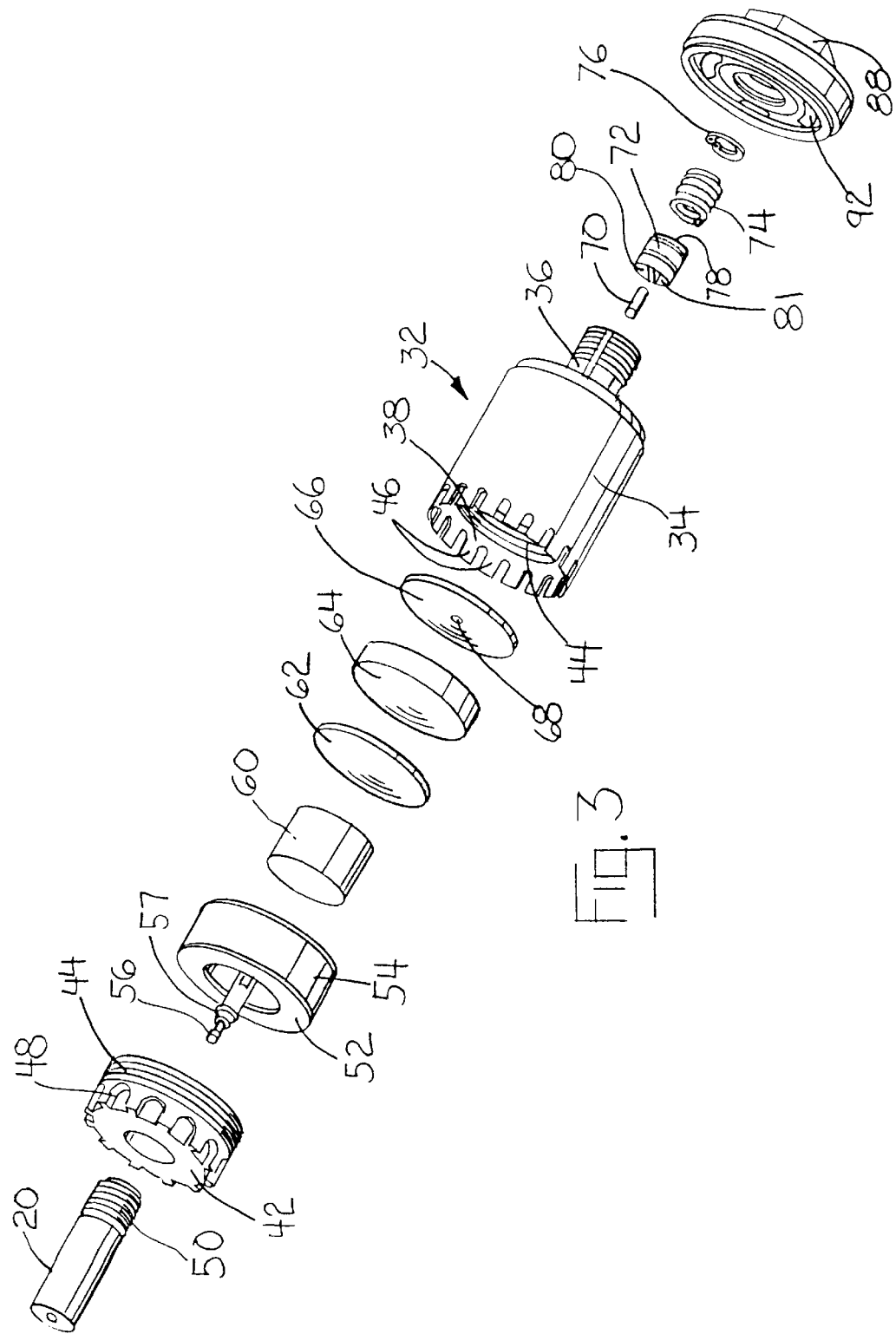
FIG. 3 is an exploded view in perspective illustrating some of the components of the piston illustrated in FIG. 2.

Referring now to FIGS. 2 and 3, the piston 14 includes an outer case 32 which defines a cavity therewithin. The outer case is stepped to define a larger diameter portion 34 and a smaller diameter portion 36 so that the cavity includes larger and smaller diameter portions 38, 40 respectively. The larger portion 34 is closed by a cover 42 through a threaded connection generally indicated by the numeral 44. The portion of the outer case 32 engaged by the cover 42 terminates in multiple circumferentially spaced tabs 46, and the corresponding portion of the cover 42 is provided with circumferentially spaced recesses 48. Accordingly, the cover can be locked in place relative to the outer case 32 by deflecting one or more of the tabs 46 with a corresponding recess 48, as will hereinafter be explained. The piston rod 20 is secured to the cover 42 through a threaded connection 50.

Mounted within larger diameter cavity portion 38 immediately inside of the cover 42 is a bobbin 52 which carries coil windings 54. An electrical connector 56 extends from the bobbin 52 and into a bore 58 that extends through the piston rod 20. Electrical connector 56 is sealed to piston rod 20 by circumferentially extending seal 57. An electrical cable (not shown) extends through bore 58 to carry electrical power to the windings 54 through the electrical connector 56. The piston rod 20 provides an electrical ground to complete the power circuit to the windings 54 in a manner well known to those skilled in the art. The side of the bobbin 52 facing away from the cover is provided with a recess that extends into the portion of the bobbin 52 circumscribed by the windings 54. This recess which receives a pellet 60 of magnetostrictive material. Accordingly, pellet 60 will be within the magnetic field generated by electrical power transmitted to the windings 54. The magetostrictive material has been described in more detail above, and has the property of constricting (shrinking) in the axial direction (that is, the direction extending along the axis of the coil) in response to an applied magnetic field. A disc-shaped transfer plate 62 extends across larger cavity portion 38 and is engaged by the pellet 60 and transfers the deformation of the pellet 60 as a result of the magnetic field applied thereto to a transfer medium 64. The transfer plate 62, outer case 32 and cover 42 define a magnetic circuit and are made of magnetically soft material.

The transfer medium 64 is a disc of a shape compliant elastomer, such as silicone rubber that is contained between the transfer plate 62 and a pin guide 66. Pin guide 66 rests on shoulder 68 defined between larger and smaller portions of the outer case 32, and includes an aperture 68 along the axis thereof that slidably receives a pin 70 that projects from a movable valve spool member 72 that is slidable within smaller diameter cavity portion 40. The spool valve member 72 is urged toward the pin guide 66 by a spring 74, which is mounted in the cavity portion 40 and is held in place by a clip 76. The spring 74 bears against the end 78 of the spool valve member 72 opposite the end 80 from which the pin 70 extends. The end 80 includes slot 81 through which damping fluid communicates through the spool valve member 72.

A first set of circumerentially extending valve elements 82 and a second set of circumerentially extending valve elements 84 are each supported on the outer circumferential surface of smaller portion 36 of case 32 and are separated by a circumferentially extending spacer 86. The valve sets 82 and 84 are described in detail in the above-mentioned U.S. Pat. No. 5,690,195, and, since they form no part of the present invention, will not be described in detail herein. As discussed in U.S. Pat. No. 5,690,195, valve sets 82 and 84 regulate flow of damping fluid across the piston 14 and thus provide damping. For clarity, the valve sets 82, 84 and spacer 86 are not shown in FIG. 3. A piston cap 88 is mounted on smaller portion 36 and holds the valve sets 82, 84 and spacer 86 in position. The outer circumferential surface of piston cap 88 is provided with seals and sealing grooves 90, which sealingly engage the inner wall of housing 12. Circumferentially spaced apertures 92 are provided in the piston cap 88, and define a portion of a first fluid path indicated by the arrow A that is controlled by valve set 82. Circumferentially spaced apertures 94 are provided through the smaller portion 36 near the end thereof through which the pin 70 extends. The apertures 94 define a portion of a second fluid path indicated by arrow B, that is controlled by the valve set 84. Communication through the second fluid path is controlled by the movable spool valve 72, which in one position closes communication through the aoertyres 94 but is movable to a position which opens communication through the apertures 94. The movable spool valve 72 is calibrated when the piston 14 is assembled, by advancing the cover 42 on the case 32 until the valve spool 72 attains a predetermined position, at which one or move of the tabs 46 are deflected into a corresponding registering recess 48, to thereby lock the cover in position.

When the windings 54 are energized, the magnetostrictive pellet 60 shrinks or constricts. Accordingly the transfer plate 62 is permitted to move toward the cover 42, which in turn allows the spring 74 acting through valve spool member 72 to push the pin 70 into transfer medium 64, thereby moving the valve spool member into a position closing the apertures 94, thereby preventing communication of damping fluid through apertures 94. Accordingly, communication of damping fluid through flow path B is prevented, so all damping is provided through flow path A and the first set of valve elements 82. When the windings 54 are deactivated, the valve spool member 72 is pushed away from valve guide 66, so that damping is provided through both fluid flow paths A and B and both sets of valve members 82 and 84. The spool valve element may be designed so that the normal position either blocks or opens the apertures 94, so that energization of the windings 54 either adds or removes the damping provided by the flow path B through second valve elements 84.

Figure 4:
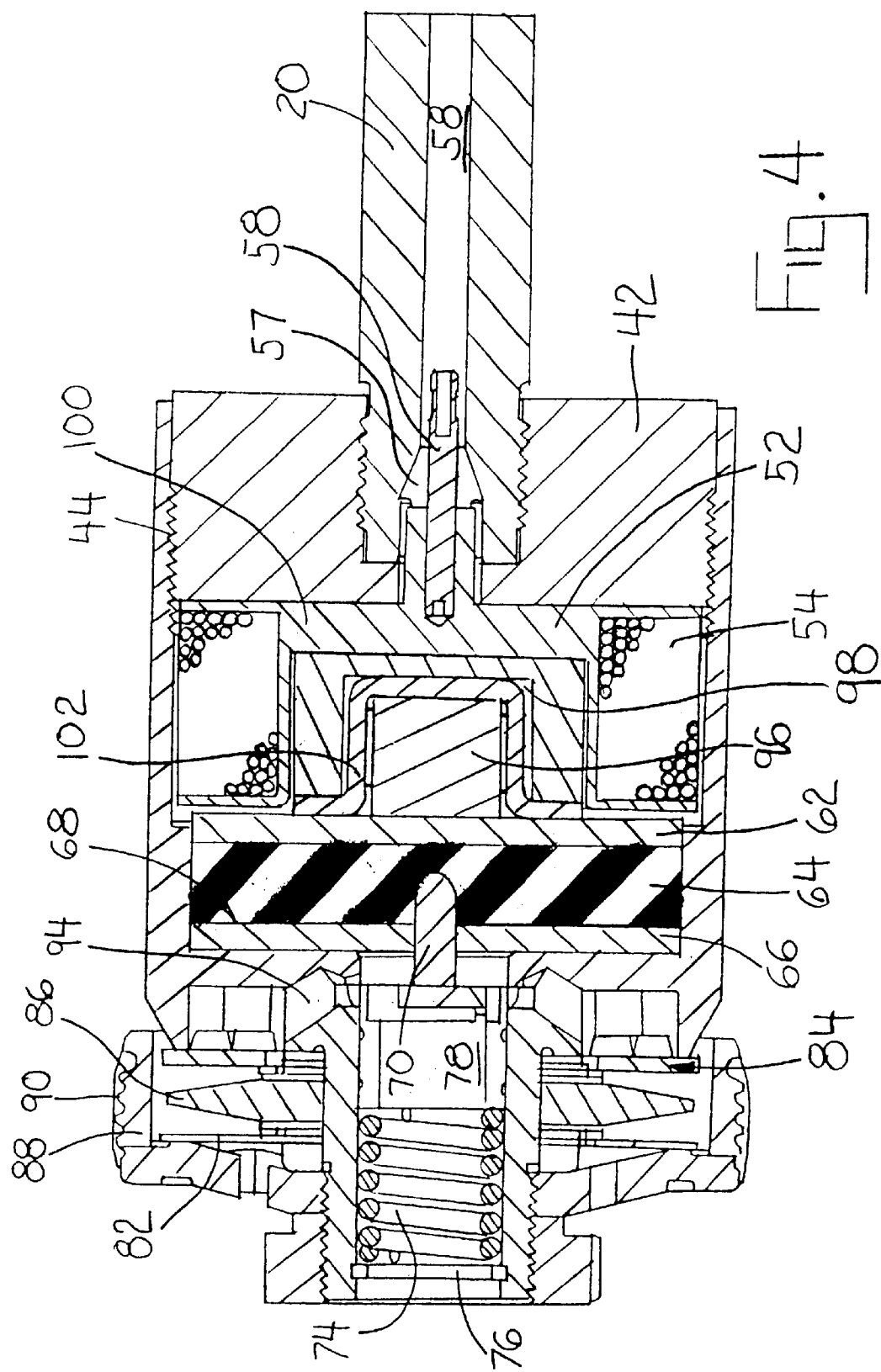
FIG. 4 is a view similar to FIG. 2, but illustrating another embodiment of the present invention.

Referring now to the embodiment of FIG. 4, where elements the same or substantially the same as those in the embodiment of FIGS. 2 and 3 retain the same reference numeral, the effect of the magnetostrictive pellet is enhanced by using a telescoping structure in which another magnetostrictive pellet 96 is nested within a cavity 98 formed in magnetostrictive pellet 100 and held in place by a support member 102, which is made of a non-magnetostrictive material. The displacement generated by the combined pellets 96 and 100 is the same as that of a single element with an axial length equal to the sum of the axial lengths of the two nested pellets, but the package size is smaller.

The embodiments of FIGS. 2, 3, and 4 may also be used with a magnetostrictive pellet that expands upon application of a magnetic field, in which case the effect of the magnetic field on the postion of the valving would be reversed; in other words,the position of the valve 72 attained with a strong magnetic field with a constricting pellet 72 will require a weak magnetic field with an expanding pellet. Alternatively, if an expanding pellet is used, the valve 72 may be provided with slots on the circumferentially extending surface thereof instead of the slot on end 81 may be used so that the valve 72 will be moved into the position allowing communication through flow path B by applying a magnetic field thereto.

Figure 5:
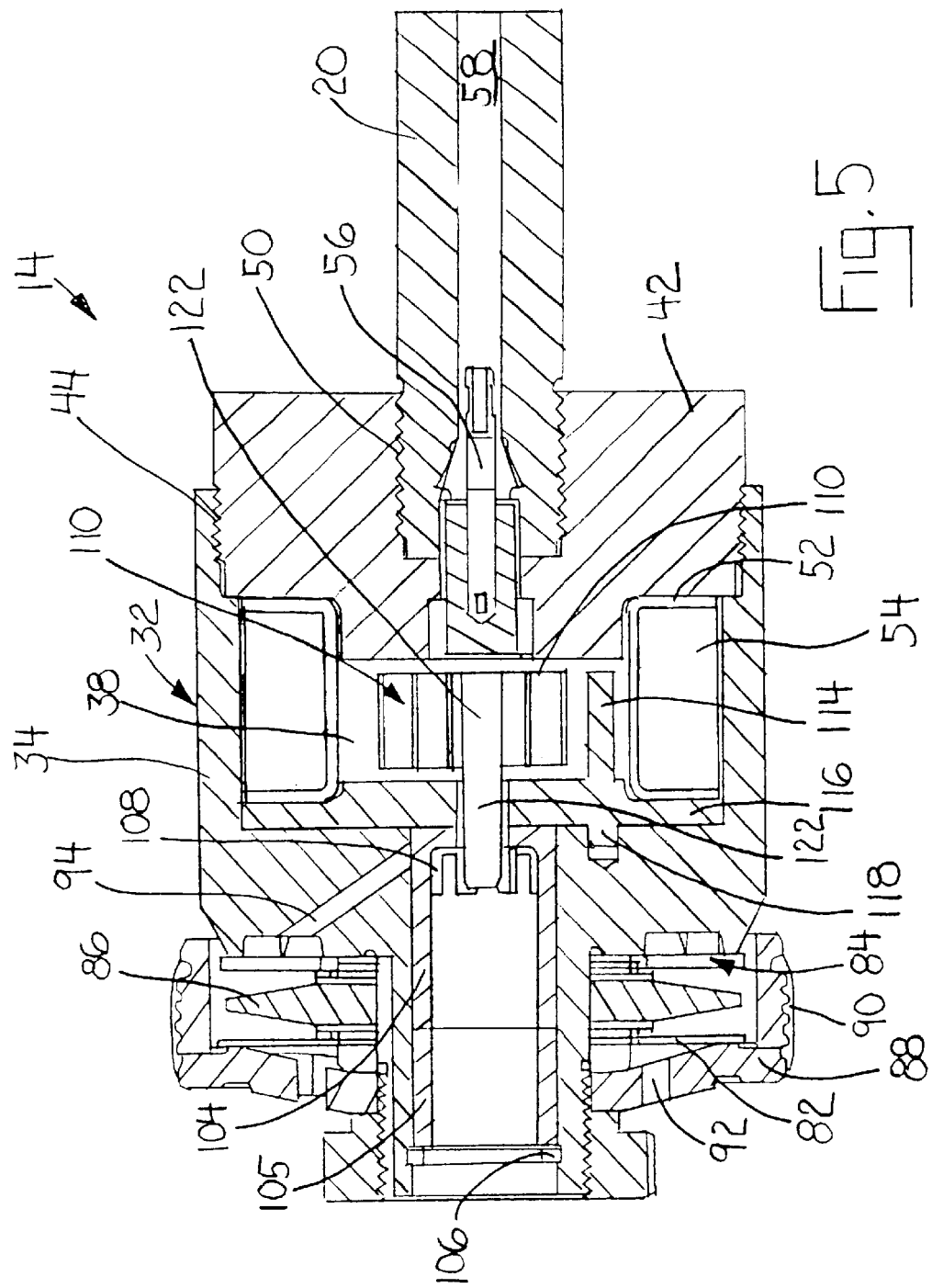
FIGS. 5 and 6 are views similar to FIGS. 2 and 3 respectively, but illustrating still another embodiment of the invention.
Figure 6:
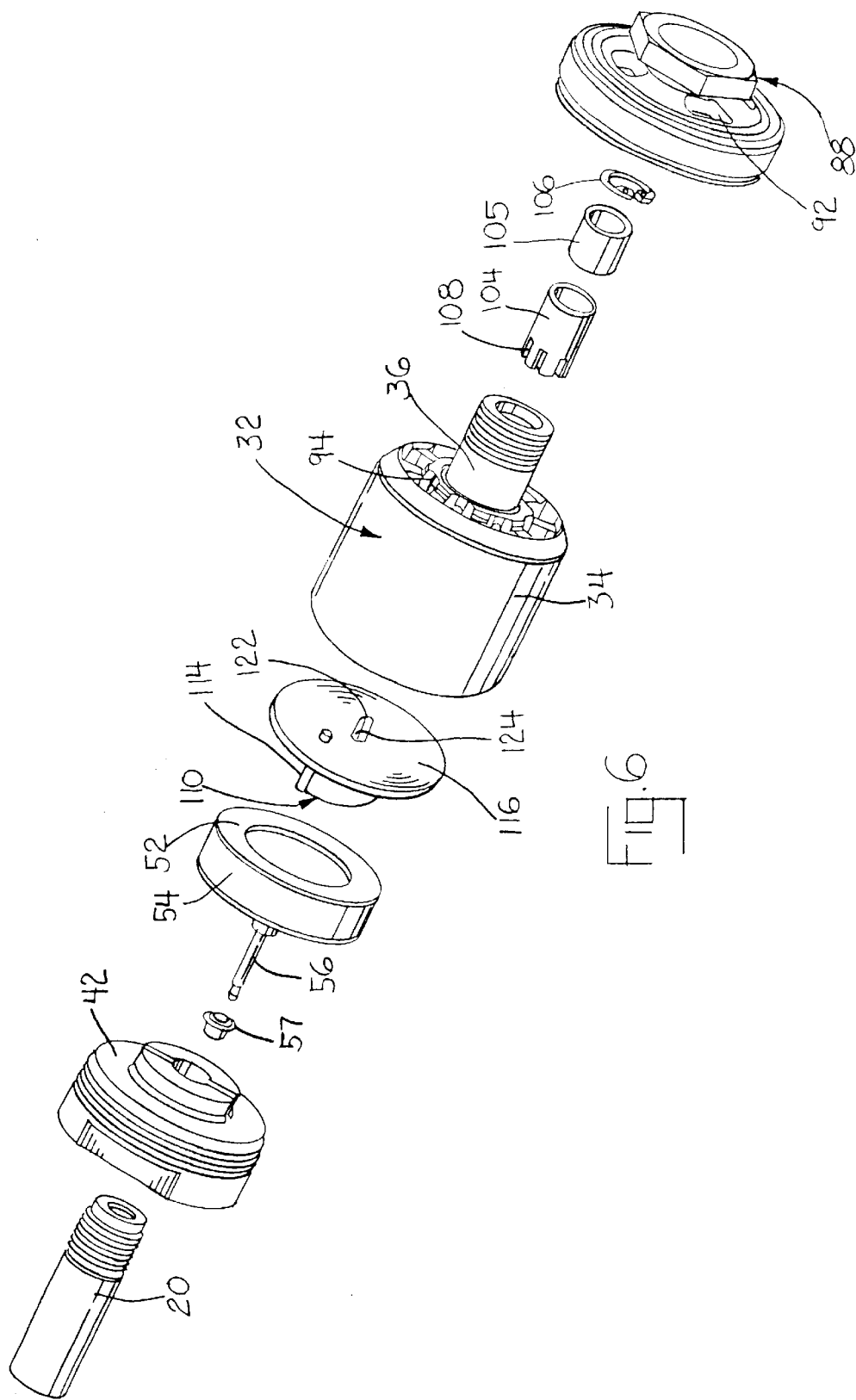
Figure 7:
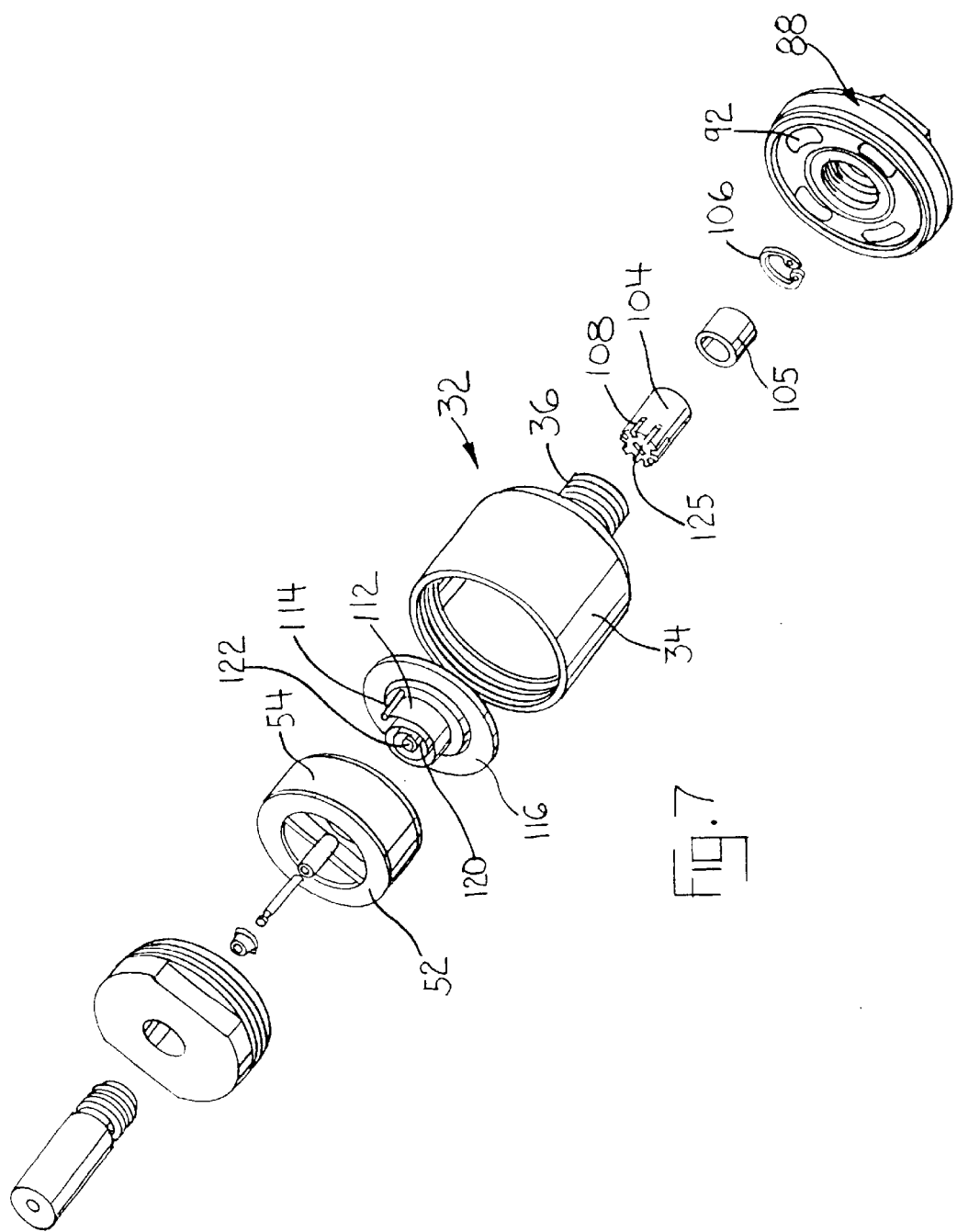
FIG. 7 is an exploded view in perspective similar to FIG. 6, but taken from a different angle to illustrate portions of the various components not shown in FIG. 6.

Referring now to the embodiment of FIGS. 5, 6 and 7, where elements the same or substantially the same as those in the embodiment of FIGS. 2 and 3 retain the same reference numeral, the spool valve member 72 is replaced by a rotary valve member 104, which is rotatable within the cavity smaller portion 40 and supported by a spacer/thrust bearing 105, which is retained by clip 106. The rotary valve member 104 is provided with multiple, circumferentially spaced, axially extending slots 108. The slots 108 are designed so that in a predetermined angular orientation of the rotary valve member 104 the slots 108 are aligned with the apertures 94, to thus permit communication of damping fluid through the second set of valve members 84 and flow bath B. However, upon rotation of the rotary valve member 104, communication through the apertures 94 and the valve set 84 is blocked, to thereby remove the damping provided by the valve set 84.

The rotary valve member 104 is operated by a spiral wound bimetalic element generally indicated by the numeral 110. Spiral bimetallic element 110 is made by bonding a sheet of magnetostrictive material to a sheet of non-magnetostrictive material of similar thickness, cutting the material into strips of an appropriate length, and then winding the strips into the spiral 110. The outer end 112 is secured to a pin 114, which is rigidly secured to a support plate 116, which is held against rotation relative to case 32 by projection 118. Support plate 116 supports the spiral element 110 nested within coil windings 54. The inner end 120 of spiral bimetallic element 110 is rigidly secured to a drive pin 122 which extends through a central aperture in support plate 116 and is rotatable relative thereto. Flats 124 are provided on the end of drive pin 122 engage corresponding flats 125 on the rotary valve member 104, to permit spiral 110 to drive the rotary valve member 104. The spiral bimetallic element 110 reacts to a magnetic field generated by coil windings 54 to rotate the rotary valve member 104 between positions permitting and blocking communication through the second set of valve elements 82 in flow path B, thereby changing the damper 10 between the mode in which all damping is provided by valve set 82 and the mode in which damping is provided by both the valve set 82 and the valve set 84.

Figure 8:
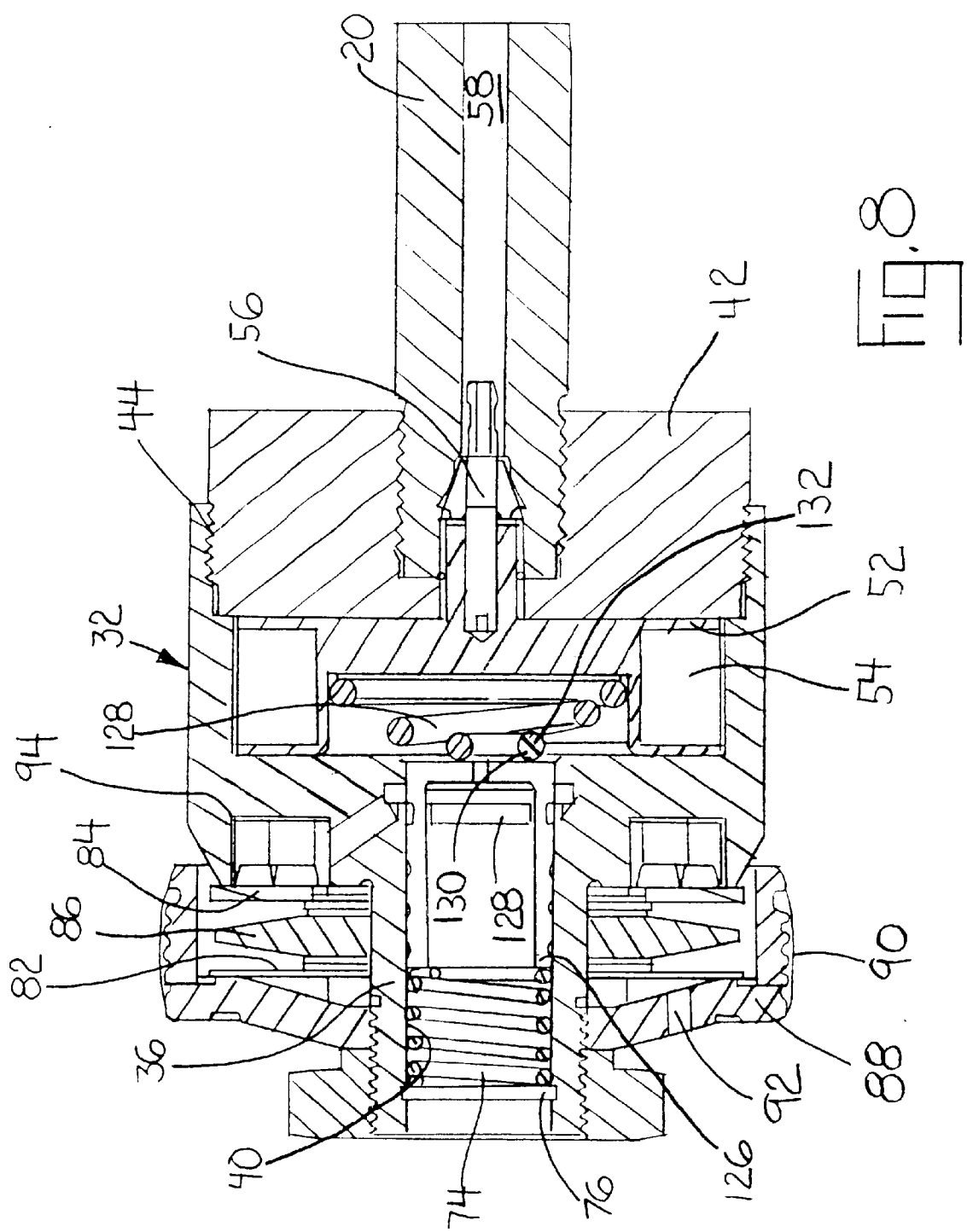
FIGS. 8 and 9 are views similar to FIGS. 2 and 3 respectively, but illustrating still another embodiment of the present invention.
Figure 9:
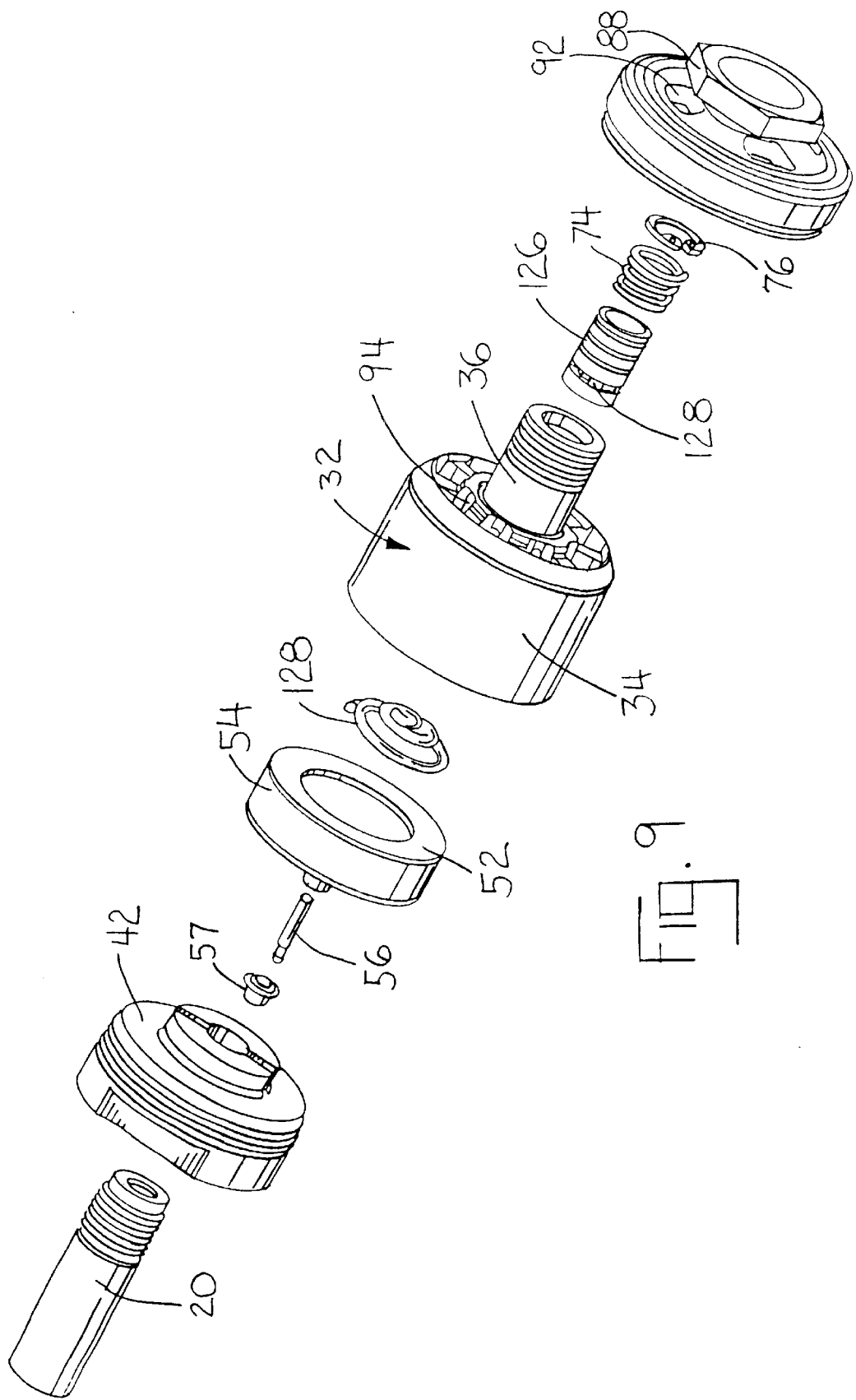

Referring now to the embodiment of FIGS. 8 and 9, where elements the same or substantially the same as those in the embodiment of FIGS. 2 and 3 retain the same reference numeral, a movable spool valve member 126 is provided with slot 128 that, depending upon the axial position of the spool valve member 126 within smaller cavity portion 40, either blocks communication through apertures 94 or permits communication through apertures 94. Spring 74 urges spool valve member 126 into enggagement with a bimetallic coil spring 128, so that the spool valve member 126 remains engaged with coil spring 128 as spring 128 expands and contracts. Spring 128 is within the magnetic field of coil windings 54 and is made of a magnetostrictive material 130 bonded to a non-magnetostrictive material 132. Spring 128 is made of two elongate strips, one of the strips being a magnetostrictive material and the other strip being a non-magnetostrictive material. The two strips are then bonded together to form a bimetallic wire having a circular cross-section. This wire is then twisted about its axis, to form a straight wire with the two materials spiraling about the wire. The wire is then coiled to form coil spring 128. The spring 128 expands and contracts in response to the magnetic field applied by coil windings 54, to thereby move the spool valve member 128 between the positions blocking or enabling communication through apertures 94. Alternatively, one end of spring 128 may be fixed to the piston and the other end secured to the spool valve member 128, thereby eliminating the spring 76.

What is claimed is:

1. A suspension damper comprising a housing filled with damping fluid, a piston slidable in said housing and dividing the housing into a compression chamber and an extension chamber, a piston rod extending from said piston through said extension chamber, said piston defining first and second passages extending therethrough to communicate damping fluid between said chambers, a valve assembly in each of said first and second passages, a movable member movable within said piston and movable between a closed position preventing communication through one of said passages and an open position preventing communication through said one passage to thereby vary the damping of the suspension damper, and an actuator for moving said movable member between said positions, said actuator including a deformable magnetostrictive element deforming in responsive to an applied magnetic field, said movable member moving between said positions in response to the deformation of said element, and a coil for applying a magnetic field to said magnetostrictive element.

2. Suspension damper as claimed in claim 1, wherein said deformable magnetostrictive element is a pellet of magnetostrictive material.

3. Suspension damper as claimed in claim 2, wherein said pellet is nested within said coil.

4. Suspension dam per as claimed in claim 2, wherein a transfer mechanism transfers deformation of said pellet to said movable member, said transfer mechanism including a compliant transfer medium.

5. Suspension damper as claimed in claim 4, wherein said transfer mechanism further includes a pin projecting from said movable member, said pin extending into said transfer medium.

6. Suspension damper as claimed in claim 4, wherein a transfer plate is slidably mounted within said piston between said pellet and said compliant transfer medium for transferring deformation of said pellet to said compliant medium.

7. Suspension damper as claimed in claim 6, wherein said transfer mechanism further includes a pin projecting from said movable member, said pin extending into said transfer medium through a pin guide mounted in said piston, said pin guide defining an aperture through which said pin extends into said compliant medium.

8. Suspension damper as claimed in claim 7, wherein said piston includes an outer case defining a cavity therewithin, said transfer plate, said compliant medium, said pin guide, said coil and said pellet being received within said cavity, and a cover closing said cavity.

9. Suspension damper as claimed in claim 8, wherein said cavity includes larger and smaller portions, said movable member being mounted in said smaller portion, said transfer plate, said compliant medium, said pin guide and said coil with said pellet nested therein being mounted in the larger portion of said cavity, said pin extending from said smaller portion into said larger portion through said pin guide to connect said movable member with the compliant medium.

10. Suspension damper as claimed in claim 9, wherein said cover is secured to said outer case through a threaded connection, and locking means for locking said threaded connection to permit adjustment of the movable member through said pin by adjustment of said threaded connection before engaging said locking means.

11. Suspension damper as claimed in claim 2, wherein said pellet includes first and second portions, said first portion being nested within said coil and defining a cavity receiving said second portion, and a support of a non-magnetostrictive material extending into said cavity for supporting said second portion therein.

12. Suspension damper as claimed in claim 1, wherein said piston includes an outer case defining a cavity therewithin having larger and smaller diameter sections, said coil and said magnetostrictive element being received within said larger diameter section of the cavity, said movable member being movable in the smaller diameter section of the cavity, and a cover closing said larger section of the cavity.

13. A suspension damper comprising a housing filled with damping fluid, a piston slidable in said housing and dividing the housing into a compression chamber and an extension chamber, a piston rod extending from said piston through said extension chamber, said piston defining first and second passages extending therethrough to communicate damping fluid between said chambers, a valve assembly in each of said first and second passages, a movable member movable within said piston and movable between a closed position preventing communication through one of said passages and an open position permitting communication through said one passage to thereby vary the damping of the suspension damper, and an actuator for moving said movable member between said positions, said actuator including a deformable magnetostrictive element deforming in responsive to an applied magnetic field, said movable member moving between said positions in response to the deformation of said element, and a coil for applying a magnetic field to said magnetostrictive element, said magnetostrictive element being a bimetalic member including a magnetostrictive material bonded to a non-magnetostrictive material.

14. Suspension damper as claimed in claim 13, wherein said magnetostrictive material and said non-magnetostrictive material are sheets of said materials bonded together to form said bimetalic element, said bimetalic element being wound into a spiral whereby said spiral winds and unwinds in response to application and release of a magnetic field.

15. Suspension damper as claimed in claim 14, wherein said spiral spring is nested within said coil.

16. Suspension damper as claimed in claim 14, wherein said movable member is rotatably mounted within said piston, said spiral being drivingly connected to said movable member wherein said spiral drives said movable member in clockwise and counterclockwise directions, in response to application and release of said magnetic field.

17. Suspension damper as claimed in claim 16, wherein said spiral has an inner end and an outer end, one of said ends being fixed to a drive pin roatatable with respect to said piston and drivingly connected to said movable member.

18. Suspension damper as claimed in claim 16 wherein one end of said spiral is fixed to a plate fixed to said piston and the other end of said spiral is fixed to a drive pin rotatable with respect to said plate and extending through an aperture in said plate to drivingly engage said movable member.

19. Suspension damper as claimed in claim 13, wherein said bimetal element is a spiral wound spring including two elongated segments bonded together to form a wire segment, one of said elongated segments being made of said magnetostrictive material and the other elongated segment being made of said non-magnetostrictive material, whereby said spring elongates and relaxes in response to application and release of a magnetic field.

20. Suspension damper as claimed in claim 19, wherein said wire segment is twisted before being wound into said spiral spring to form a straight wire with the magnetostrictive and non-magnetostrictive material spiraling around the wire segment.

21. Suspension damper as claimed in claim 19, wherein said movable member is slidably mounted within said piston and yieldably urged by a resilient member to one of said open and closed positions, said spring being connected to said movable member to urge the latter to the other of said open and closed positions in response to application of said magnetic field to said spring.

22. Suspension damper as claimed in claim 13, wherein said bimetal element is a coil spring, said coil spring changing in length in response to application of said magnetic field.

23. Suspension damper as claimed in claim 22, wherein said movable member is slidably mounted within said piston and yieldably urged by a resilient member to one of said open and closed positions, said spring being connected to said movable member to urge the latter to the other of said open and closed positions in response to application of said magnetic field to said spring.

* * * * *